United States Patent
Ren et al.

(10) Patent No.: US 12,267,819 B2
(45) Date of Patent: Apr. 1, 2025

(54) COMPLEXITY REDUCTION FOR SLOT FORMAT DETERMINATION

(71) Applicant: QUALCOMM Incorporated, San Diego, CA (US)

(72) Inventors: Yuwei Ren, Beijing (CN); Huilin Xu, Temecula, CA (US); Jing Lei, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 338 days.

(21) Appl. No.: 17/758,056

(22) PCT Filed: Jan. 25, 2020

(86) PCT No.: PCT/CN2020/074049
§ 371 (c)(1),
(2) Date: Jun. 27, 2022

(87) PCT Pub. No.: WO2021/147118
PCT Pub. Date: Jul. 29, 2021

(65) Prior Publication Data
US 2023/0049137 A1    Feb. 16, 2023

(51) Int. Cl.
*H04W 72/0446*    (2023.01)
(52) U.S. Cl.
CPC .............................. *H04W 72/0446* (2013.01)
(58) Field of Classification Search
CPC .............................................. H04W 72/0446
See application file for complete search history.

(56) References Cited

U.S. PATENT DOCUMENTS

| 12,035,164 B2* | 7/2024 | Lee ........................ H04L 5/0057 |
| 12,035,308 B2* | 7/2024 | Hwang ............. H04W 72/1268 |
| 2013/0010709 A1* | 1/2013 | Earnshaw ............. H04W 72/23 370/329 |

(Continued)

FOREIGN PATENT DOCUMENTS

| CN | 108770064 A | 11/2018 |
| CN | 110115087 A | 8/2019 |

(Continued)

OTHER PUBLICATIONS

CATT: "[89-20] Email Discussion: Group-Common PDCCH for NR", 3GPP TSG RAN WG1 Meeting #AH_NR2, Draft; R1-1710968, 3rd Generation Partnership Project (3GPP), Mobile Competence Centre; 650, Route Des Lucioles; F-06921 Sophia-Antipolis Cedex; France, vol. RAN WG1, No. Qingdao; Jun. 27, 2017-Jun. 30, 2017, Jun. 28, 2017, XP051305938, 22 pages, Parts 1 to 2, pp. 9 and 10.

(Continued)

*Primary Examiner* — Melanie Jagannathan
(74) *Attorney, Agent, or Firm* — Harrity & Harrity, LLP \ Qualcomm

(57) ABSTRACT

Various aspects of the present disclosure generally relate to wireless communication. In some aspects, a user equipment may determine to not support one or more downlink control information communications for dynamic slot format determination, and determine a slot format based at least in part on radio resource control signaling from a network. Numerous other aspects are provided.

22 Claims, 9 Drawing Sheets

(56) References Cited

U.S. PATENT DOCUMENTS

| | | | | |
|---|---|---|---|---|
| 2015/0358827 | A1* | 12/2015 | Bendlin | H04W 16/14 455/454 |
| 2018/0227156 | A1* | 8/2018 | Papasakellariou | H04W 72/0453 |
| 2019/0140725 | A1* | 5/2019 | Aiba | H04W 72/0446 |
| 2019/0149269 | A1 | 5/2019 | Chatterjee et al. | |
| 2019/0215095 | A1 | 7/2019 | Park | |
| 2019/0215870 | A1* | 7/2019 | Babaei | H04L 5/0092 |
| 2019/0261315 | A1* | 8/2019 | Zhang | H04L 1/0001 |
| 2019/0349964 | A1* | 11/2019 | Liou | H04W 76/27 |
| 2020/0028659 | A1* | 1/2020 | Huang | H04L 5/0092 |
| 2020/0045696 | A1* | 2/2020 | Huang | H04L 5/10 |
| 2020/0260442 | A1 | 8/2020 | Yi | |
| 2020/0267756 | A1* | 8/2020 | Fakoorian | H04W 56/001 |
| 2021/0014931 | A1* | 1/2021 | Noh | H04L 5/0035 |
| 2021/0051672 | A1* | 2/2021 | Rastegardoost | H04W 74/006 |
| 2021/0058940 | A1* | 2/2021 | Choi | H04W 72/23 |
| 2021/0112432 | A1* | 4/2021 | Yang | H04W 72/23 |
| 2021/0176735 | A1* | 6/2021 | Deng | H04W 72/0453 |
| 2021/0227517 | A1* | 7/2021 | Yi | H04W 72/23 |
| 2021/0368534 | A1* | 11/2021 | Sato | H04L 1/0003 |
| 2021/0410165 | A1* | 12/2021 | Xiong | H04L 5/001 |
| 2022/0007405 | A1* | 1/2022 | Takeda | H04L 5/14 |
| 2022/0109998 | A1* | 4/2022 | Wei | H04W 16/10 |
| 2022/0110181 | A1* | 4/2022 | Miao | H04L 1/1822 |
| 2022/0131652 | A1* | 4/2022 | Bae | H04L 5/1469 |
| 2022/0159683 | A1* | 5/2022 | Islam | H04W 72/1268 |
| 2022/0191903 | A1* | 6/2022 | Bae | H04L 1/1893 |
| 2022/0201716 | A1* | 6/2022 | Yi | H04W 72/0453 |
| 2022/0217715 | A1* | 7/2022 | Bae | H04W 72/21 |
| 2022/0240284 | A1* | 7/2022 | Zhou | H04L 5/0096 |
| 2022/0264568 | A1* | 8/2022 | Lin | H04L 1/1854 |
| 2022/0322349 | A1* | 10/2022 | Kim | H04W 74/0808 |
| 2022/0338235 | A1* | 10/2022 | Bagheri | H04L 5/0094 |
| 2022/0345921 | A1* | 10/2022 | Liu | H04L 5/0053 |
| 2022/0353711 | A1* | 11/2022 | Ying | H04W 72/1263 |
| 2022/0353894 | A1* | 11/2022 | Nogami | H04L 5/0053 |
| 2022/0394751 | A1* | 12/2022 | Myung | H04L 1/18 |
| 2022/0408479 | A1* | 12/2022 | Wang | H04W 74/006 |
| 2023/0127160 | A1* | 4/2023 | Khoshkholgh Dashtaki | H04W 74/0836 370/329 |
| 2024/0236694 | A1* | 7/2024 | Bendlin | H04W 74/0816 |

FOREIGN PATENT DOCUMENTS

| | | |
|---|---|---|
| CN | 110324916 A | 10/2019 |
| CN | 110351874 A | 10/2019 |
| KR | 20190046699 A | 5/2019 |
| WO | 2018230965 A2 | 12/2018 |

OTHER PUBLICATIONS

Supplementary European Search Report—EP20915570—Search Authority—The Hague—Sep. 29, 2023.

CATT: "Configuration and Monitoring of the Group-Common PDCCH", 3GPP Draft, 3GPP TSG RAN WG1 Meeting #AH_NR2, R1-1710082, 3rd Generation Partnership Project (3GPP), Mobile Competence Centre; 650, Route Des Lucioles; F-06921 Sophia-Antipolis Cedex; France, vol. RAN WG1, No. Qingdao; Jun. 27, 2017-Jun. 30, 2017, Jun. 26, 2017, 5 Pages, XP051299306, Retrieved from the Internet: URL: http://www.3gpp.org/ftp/Meetings_3GPP_SYNC/RAN1/Docs/ [retrieved on Jun. 26, 2017] Paragraphs [02.1]-[02.2].

International Search Report and Written Opinion—PCT/CN2020/074049—ISA/EPO—Oct. 26, 2020.

CATT: "[89-20] Email Discussion: Group-Common PDCCH for NR", 3GPP TSG RAN WG1 Meeting #AH_NR2, R1-1710968, No. Qingdao, P. R. China, Jun. 27, 2017-Jun. 30, 2017, 22 Pages, Jun. 28, 2017, pp. 4, 10-21.

* cited by examiner

| Format | \ | Symbol Number in a slot | | | | | | | | | | | | | |
|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 |
| 0 | | D | D | D | D | D | D | D | D | D | D | D | D | D | D |
| 1 | | U | U | U | U | U | U | U | U | U | U | U | U | U | U |
| 2 | | F | F | F | F | F | F | F | F | F | F | F | F | F | F |
| 3 | | D | D | D | D | D | D | D | D | D | D | D | D | D | F |
| 4 | | D | D | D | D | D | D | D | D | D | D | D | D | F | F |
| 5 | | D | D | D | D | D | D | D | D | D | D | D | F | F | F |
| 6 | | D | D | D | D | D | D | D | D | D | D | F | F | F | F |
| 7 | | D | D | D | D | D | D | D | D | D | F | F | F | F | F |
| 8 | | F | F | F | F | F | F | F | F | F | F | F | F | F | U |
| 9 | | F | F | F | F | F | F | F | F | F | F | F | F | U | U |
| 10 | | F | U | U | U | U | U | U | U | U | U | U | U | U | U |
| 11 | | F | F | U | U | U | U | U | U | U | U | U | U | U | U |
| 12 | | F | F | F | U | U | U | U | U | U | U | U | U | U | U |
| 13 | | F | F | F | F | U | U | U | U | U | U | U | U | U | U |
| 14 | | F | F | F | F | F | U | U | U | U | U | U | U | U | U |

Slot formats for normal cyclic prefix
D: Downlink, U: Uplink, F: Flexible

FIG. 4

COMPLEXITY REDUCTION FOR SLOT FORMAT DETERMINATION

CROSS-REFERENCE TO RELATED APPLICATION

This application is a 371 national stage of Patent Cooperation Treaty (PCT) Application No. PCT/CN2020/074049 filed on Jan. 25, 2020, entitled "COMPLEXITY REDUCTION FOR SLOT FORMAT DETERMINATION," which is hereby expressly incorporated by reference herein.

FIELD OF THE DISCLOSURE

Aspects of the present disclosure generally relate to wireless communication and to techniques and apparatuses for complexity reduction for slot format determination.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include determining to not support one or more downlink control information (DCI) communications for dynamic slot format determination, and determining a slot format based at least in part on radio resource control (RRC) signaling from a network and independently from the one or more DCI communications for dynamic slot format determination.

In some aspects, a UE for wireless communication may include memory and one or more processors operatively coupled to the memory. The memory and the one or more processors may be configured to determine to not support one or more DCI communications for dynamic slot format determination, and determine a slot format based at least in part on RRC signaling from a network and independently from the one or more DCI communications for dynamic slot format determination.

In some aspects, a non-transitory computer-readable medium may store one or more instructions for wireless communication. The one or more instructions, when executed by one or more processors of a UE, may cause the one or more processors to: determine to not support one or more DCI communications for dynamic slot format determination, and determine a slot format based at least in part on RRC signaling from a network and independently from the one or more DCI communications for dynamic slot format determination.

In some aspects, an apparatus for wireless communication may include means for determining to not support one or more DCI communications for dynamic slot format determination, and means for determining a slot format based at least in part on RRC signaling from a network and independently from the one or more DCI communications for dynamic slot format determination.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a block diagram conceptually illustrating an example set of slot formats for a normal cyclic prefix, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
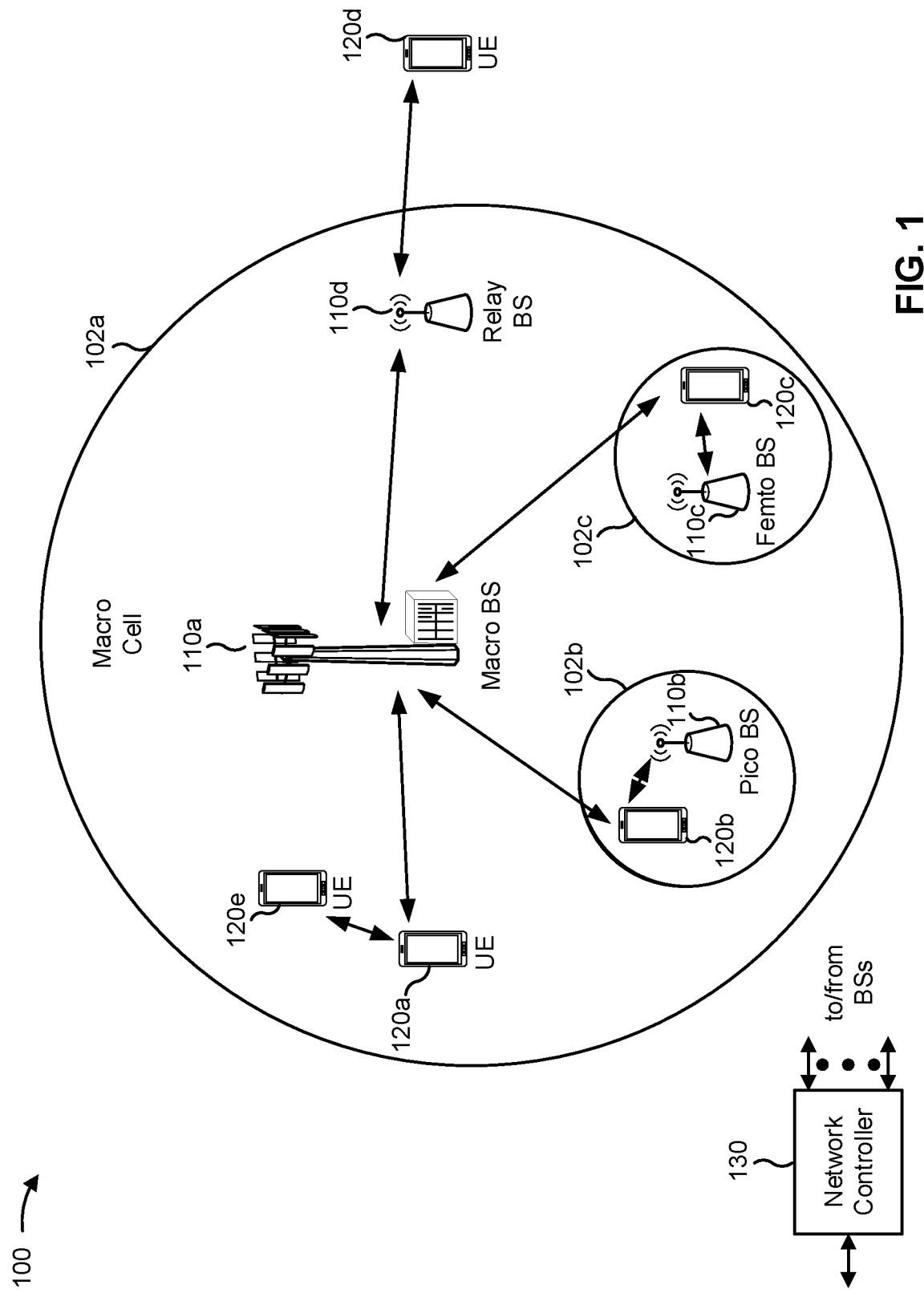
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
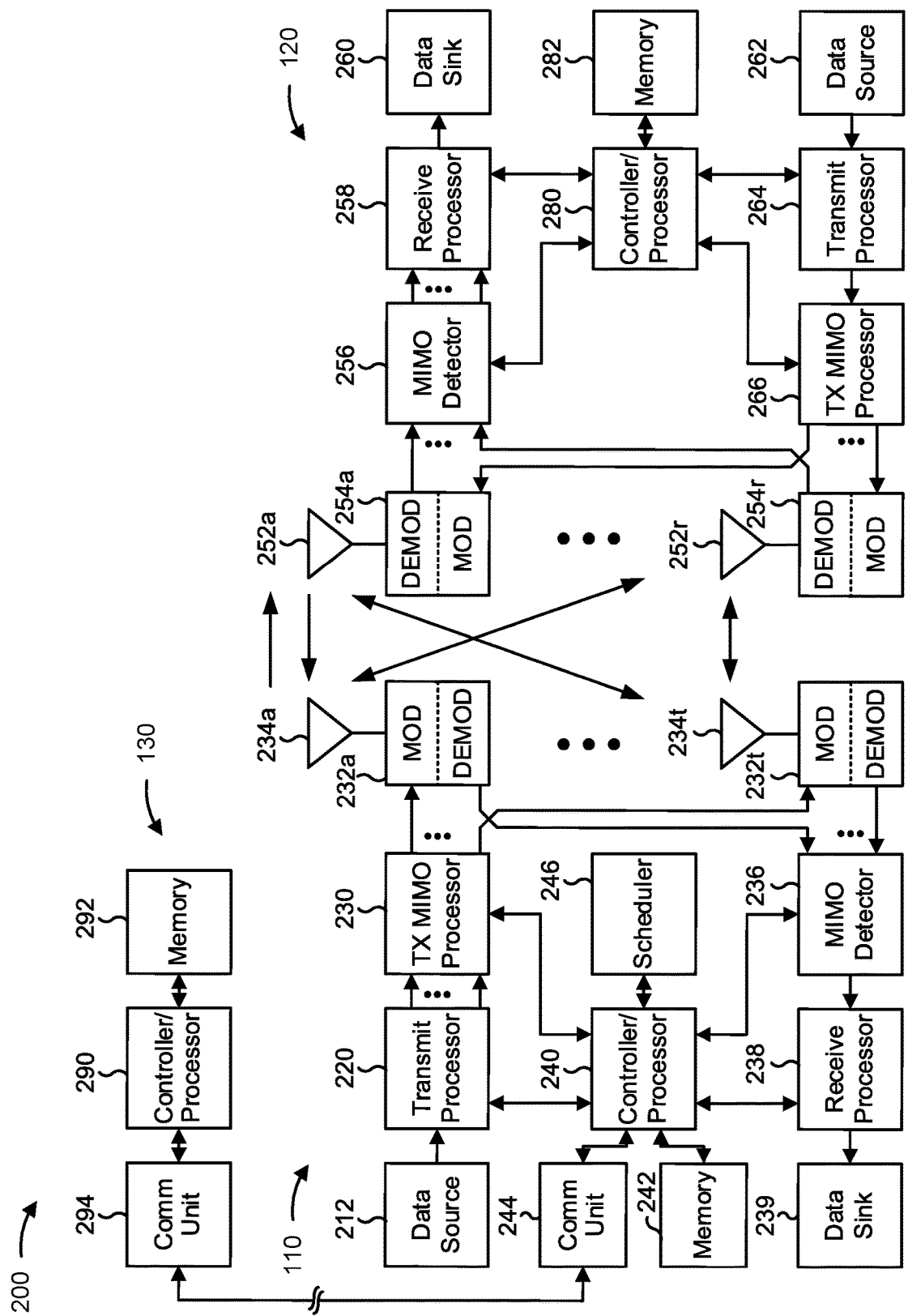
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with complexity reduction for slot format determination, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 700 of FIG. 7 and/or other processes as described herein. A scheduler 246 may schedule UEs for data transmission on the downlink and/or uplink.

In some aspects, UE 120 may include means for determining to not support one or more DCI communications for dynamic slot format determination; means for determining a slot format based at least in part on RRC signaling from a network and independently from the one or more DCI communications for dynamic slot format determination, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
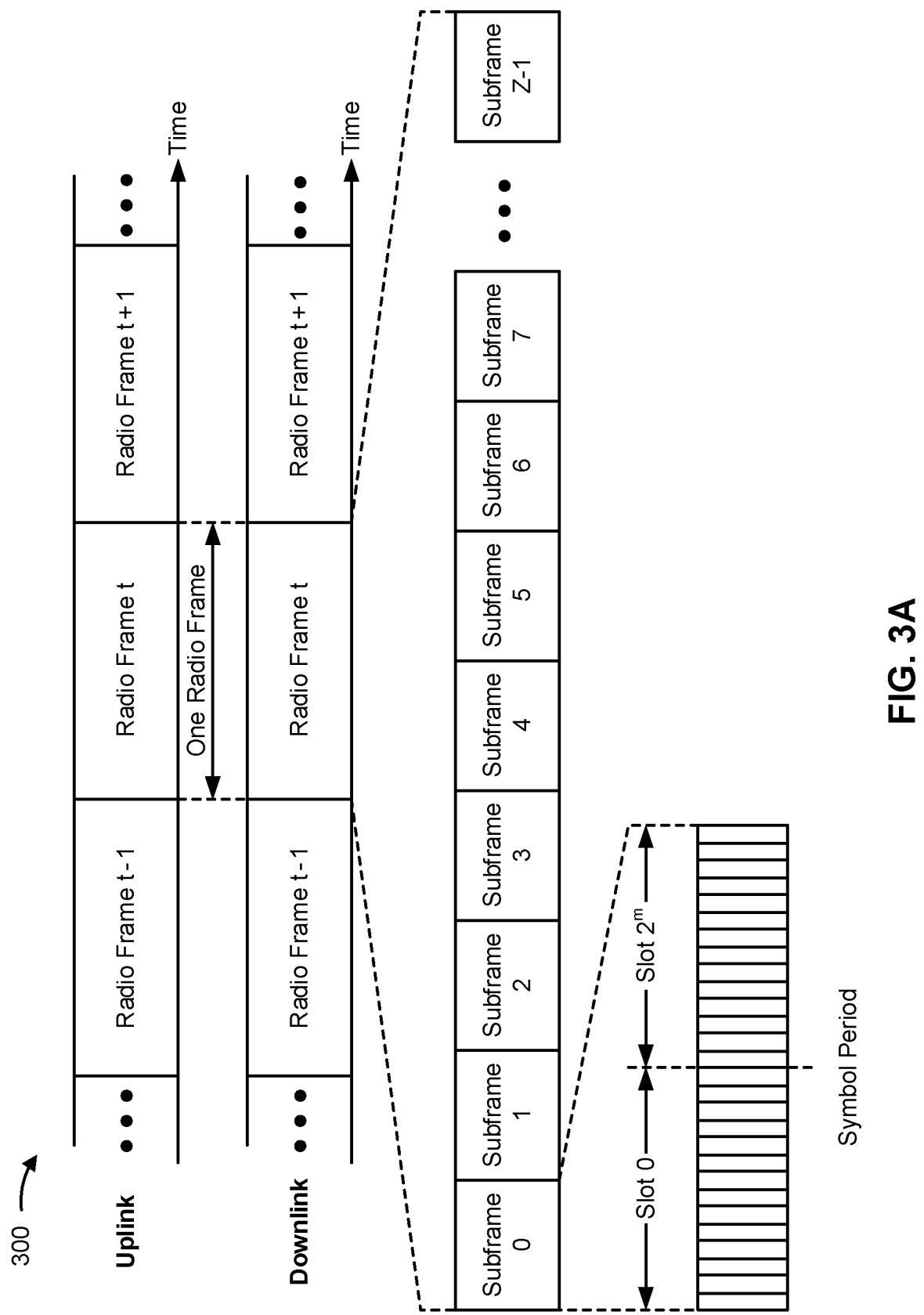
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
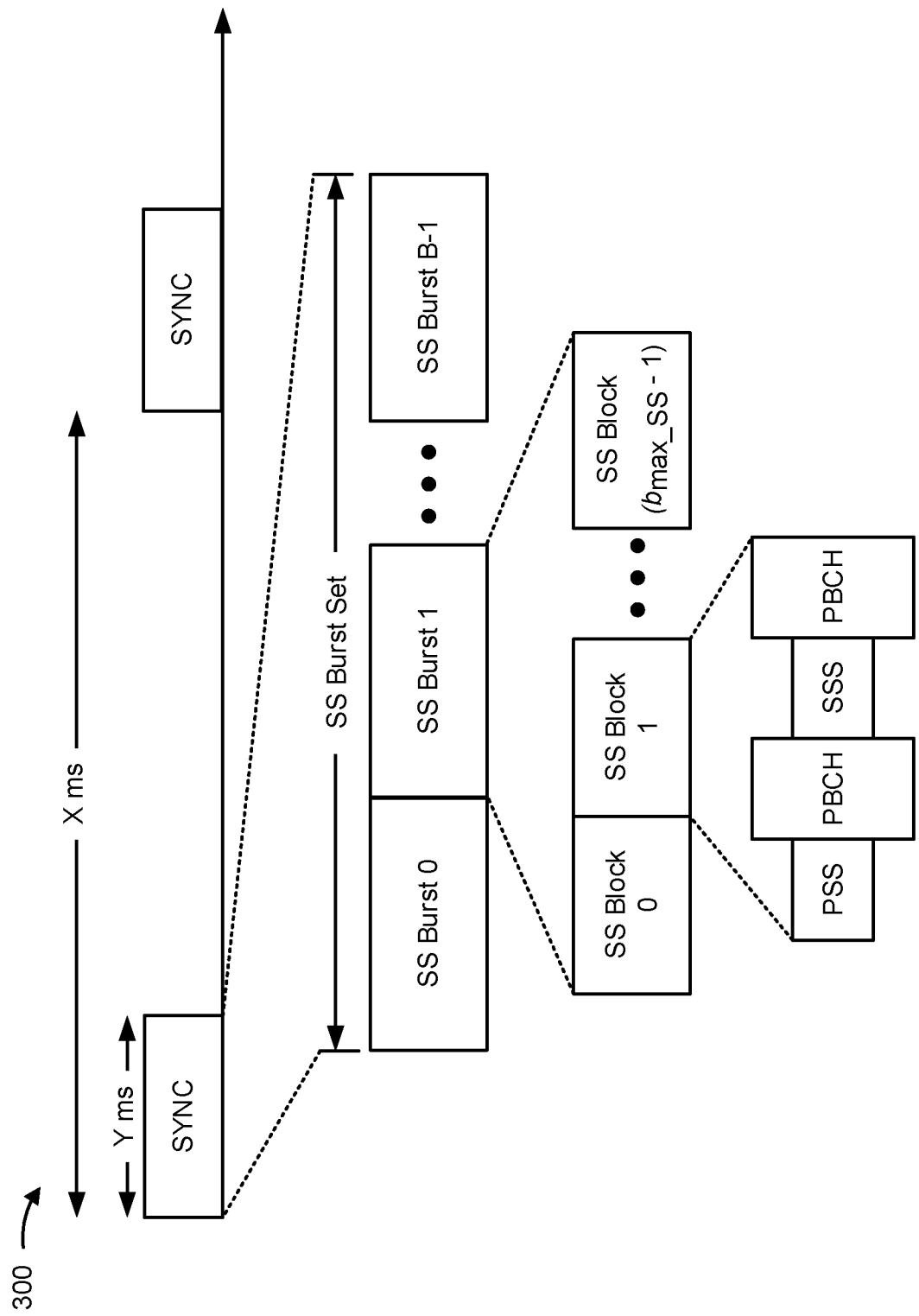
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

FIG. 4 is a block diagram conceptually illustrating an example set of slot formats for a normal cyclic prefix, in accordance with various aspects of the present disclosure. In some aspects, a network may select a slot format for a UE and may indicate the selection via RRC signaling, one or more DCI communications, and/or the like. Each symbol number in a slot may be identified for uplink (shown as "U"), downlink (shown as "D"), or flexible (shown as "F").

As indicated above, FIG. 4 is provided as an example. Other examples may differ from what is described with regard to FIG. 4.

A UE may determine a slot format for a slot (e.g., with an identification of UL, DL, or flexible for the symbols of the slot). The slot format may be based at least in part on an RRC configuration indicated in RRC signaling. The RRC configuration may provide one or more slot formats that apply to a set of slots.

In some networks, the slot format may be further based at least in part on one or more DCI communications. For example, the UE may receive a slot format indicator (SFI) DCI scrambled by a slot format indication radio network temporary identifier (SFI-RNTI) to indicate a slot format for one or more slots (e.g., a slot format for each slot in a number of slots starting from a slot during which the UE detects the SFI DCI). The UE may use the RRC configuration of the slot format and the SFI DCI of the slot format to jointly and dynamically determine the slot format for this slot.

In some networks the UE may be required to constantly be configured to dynamically determine the slot format, including using a DCI communication to identify one or more symbols as UL, DL, or flexible when the one or more symbols are identified as flexible in the RRC signaling, when the one or more symbols are identified as UL or DL in the RRC signaling, and/or the like.

Dynamic determination of a slot format may be a complicated procedure for the UE to implement and may consume computing resources of the UE. Additionally, if the UE has insufficient computing resources to perform the dynamic determination of the slot format (e.g., in time to configure UE components based at least in part on the slot format), attempting and/or failing to dynamically determine the slot format may cause one or more communication errors, recovery from which may consume additional computing, communication, and/or network resources.

In some aspects described herein, a UE (e.g., UE 120) may determine to not support one or more DCI communications for dynamic slot format determination. In some aspects, the UE may provide an indication to a network that the UE does not support the one or more DCI communications for dynamic slot format determination. The UE may determine a slot format based at least in part on RRC signaling from the network. In some aspects, the UE may ignore and/or not receive the one or more DCI communications for dynamic slot determination. In this way, the UE may conserve computing resources that may otherwise be consumed by attempting to dynamically determine the slot format (e.g., cancel one or more indications of UL, DL, or flexible from the RRC signaling). Additionally, the UE may conserve computing, communication, and/or network resources that may otherwise be consumed by recovering from a communication error based at least in part on the UE having insufficient computing resources to perform a dynamic determination of the slot format.

Figure 5A:
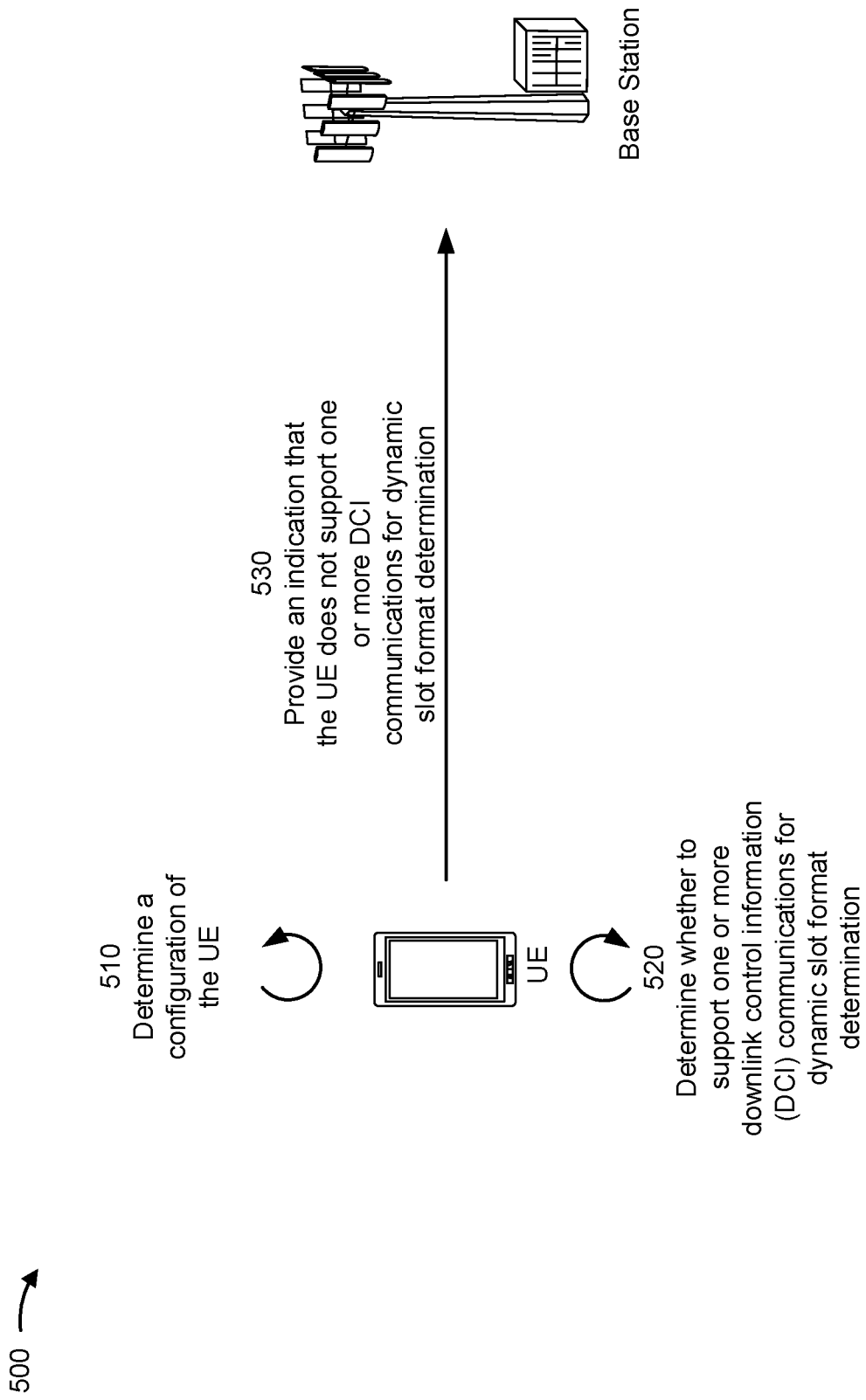
FIGS. 5A and 5B are diagrams illustrating one or more examples of complexity reduction for slot format determination, in accordance with various aspects of the present disclosure.
Figure 5B:
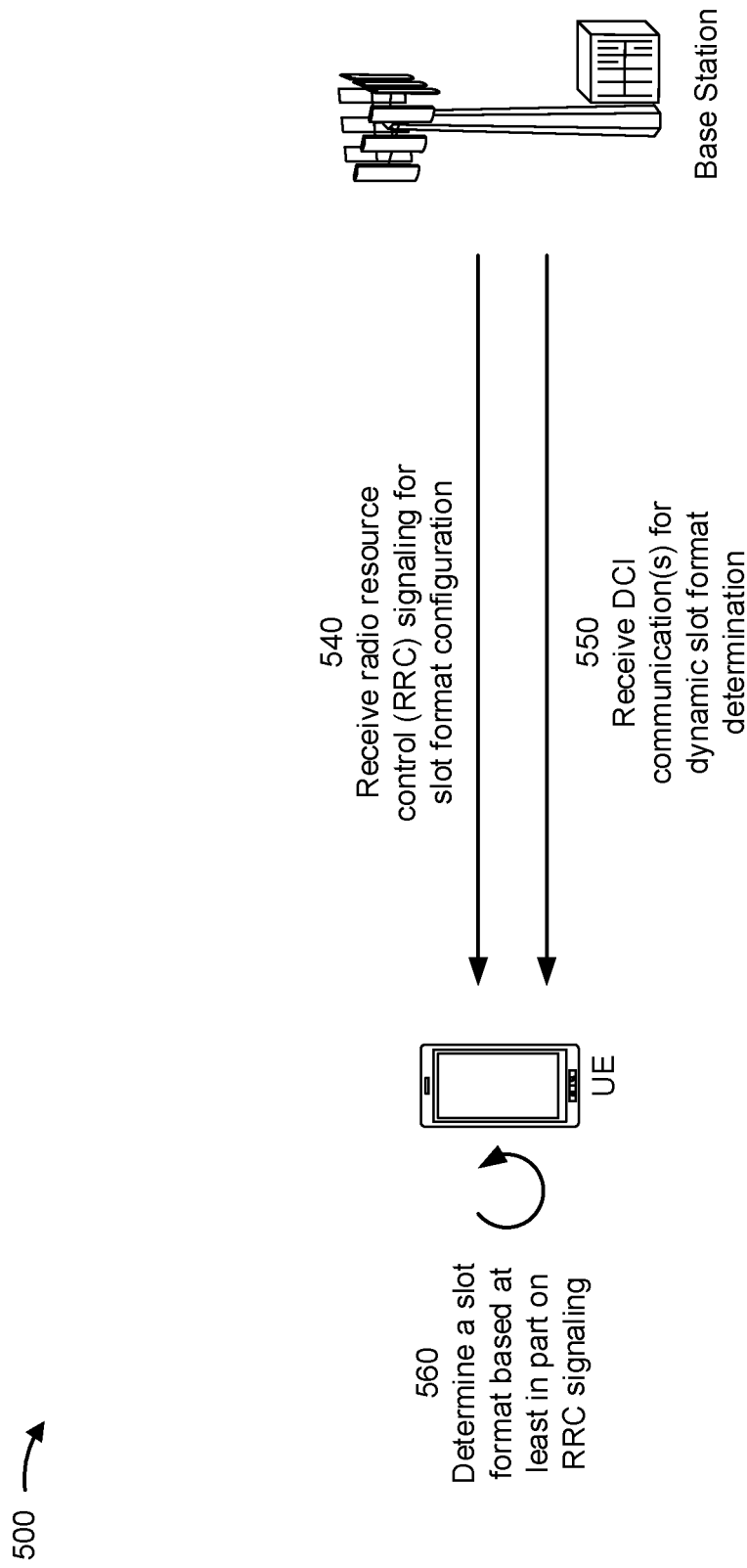

FIGS. 5A and 5B are diagrams illustrating one or more examples 500 of complexity reduction for slot format determination, in accordance with various aspects of the present disclosure. FIGS. 5A and 5B show a UE (e.g., UE 120) communicating with a base station (e.g., base station 110) to determine a slot format. In some aspects, the UE and the base station may be included in a network, such as wireless network 100. In some aspects, the UE may communicate with the base station on a wireless access link, which may include a downlink and an uplink. In some aspects, the slot format may be for a carrier in an unpaired spectrum.

As shown in FIG. 5A, and by reference number 510, the UE may determine a configuration of the UE. In some aspects, the configuration may be based at least in part on capabilities of the UE. For example, the UE may be a low-complexity UE (e.g., a low-tier UE, a reduced capability UE, or an NR-light UE) that may have insufficient processing and/or communication capabilities (e.g., based at least in part on components of the UE, an operating system of the UE, software executed by the UE, and/or the like). In some aspects, the configuration may be based at least in part on an operation mode of the UE. For example, the UE may operate in a power saving mode, a heat-reduction mode, a limited communication mode, and/or the like.

In some aspects, the configuration (e.g., the operation mode) of the UE may be reconfigurable. For example, the UE may automatically reconfigure the configuration based at least in part on changed conditions (e.g., a power level satisfying a threshold, a temperature of the UE satisfying a threshold, a parameter associated with the wireless access link satisfying a threshold, and/or the like). In some aspects, the UE may receive input (e.g., from a user, the network, and/or the like) to change the configuration of the UE.

As shown by reference number 520, the UE may determine whether to support one or more DCI communications for dynamic slot format determination. In some aspects, the UE may determine to not support the one or more DCI communications for dynamic slot format determination based at least in part on, for example, the configuration of the UE.

In some aspects, the one or more DCI communications may comprise an SFI-RNTI (e.g., a DCI format 2_0 communication that is scrambled by SFI-RNTI). In some aspects, the one or more DCI communications may comprise one or more of a DCI format 1_0 communication, a DCI format 1_1 communication, a DCI format 0_0 communication, a DCI format 0_1 communication, or a DCI format 2_3 communication. These DCI communications may include indications of UL or DL for one or more symbols of an upcoming slot that may already be configured using the RRC signaling. For example, DCI format 1_0 communications and DCI format 1_1 communications are DL scheduling DCI communications and DCI format 0_1 communication are UL scheduling DCI communications that may be used to trigger channel state information reference signal (CSI-RS) reception. Additionally, DCI format 0_0 communications and DCI format 0_1 communications are UL scheduling DCIs and DCI format 2_3 communications trigger sounding reference signal (SRS) transmissions. In some aspects, a UL of hybrid automatic repeat request acknowledgement (HARQ-ACK) may be scheduled for data that the UE receives based at least in part on a scheduled DL by a DCI format 1_0 communication and/or a DCI format 1_1 communication.

In some aspects, the UE may determine to not support a set of DCI communications associated with scheduling and/or triggering a transmission or a reception during a particular symbol of a slot. In some aspects, the set of DCI communications may comprise a subset of the DCI communications or may comprise all of the DCI communications that may be used for dynamic slot format determination.

As shown by reference number 530, the UE may provide an indication that the UE does not support the one or more DCI communications for dynamic slot format determination. In some aspects, the indication may include an explicit indication that the UE does not support the one or more DCI communications for dynamic slot format determination. For example, the indication may include an indication of one or more types of DCI communications (e.g., DCI formats) that the UE does not support for dynamic slot format determination and/or an indication of one or more types of DCI communications that the UE does support for dynamic slot format determination.

In some aspects, the indication may include an indication of capabilities of the UE and/or an operation mode of the UE. Based at least in part on the capabilities and/or the operation mode of the UE, the network may identify the one or more DCI communications for dynamic slot format determination that the UE does not support. The network may determine to not transmit DCI communications that the UE does not support.

As shown in FIG. 5B, and by reference number 540, the UE may receive RRC signaling for slot format configuration. In some aspects, the RRC signaling may include a cell-specific slot format configuration (e.g., tdd-UL-DL-ConfigurationCommon). The cell-specific slot format configuration may indicate, to a set of UEs having an established wireless access link for communication with the network in a cell, a slot format for one or more slots. For example, the cell-specific slot format configuration may configure a plurality of (e.g., 10 to 100) slots based at least in part on a single RRC communication. In some aspects, the cell-specific slot format configuration may identify one or more symbols, within the plurality of slots, as flexible symbols that can be identified for UL or DL or may remain as flexible symbols.

Figure 6:
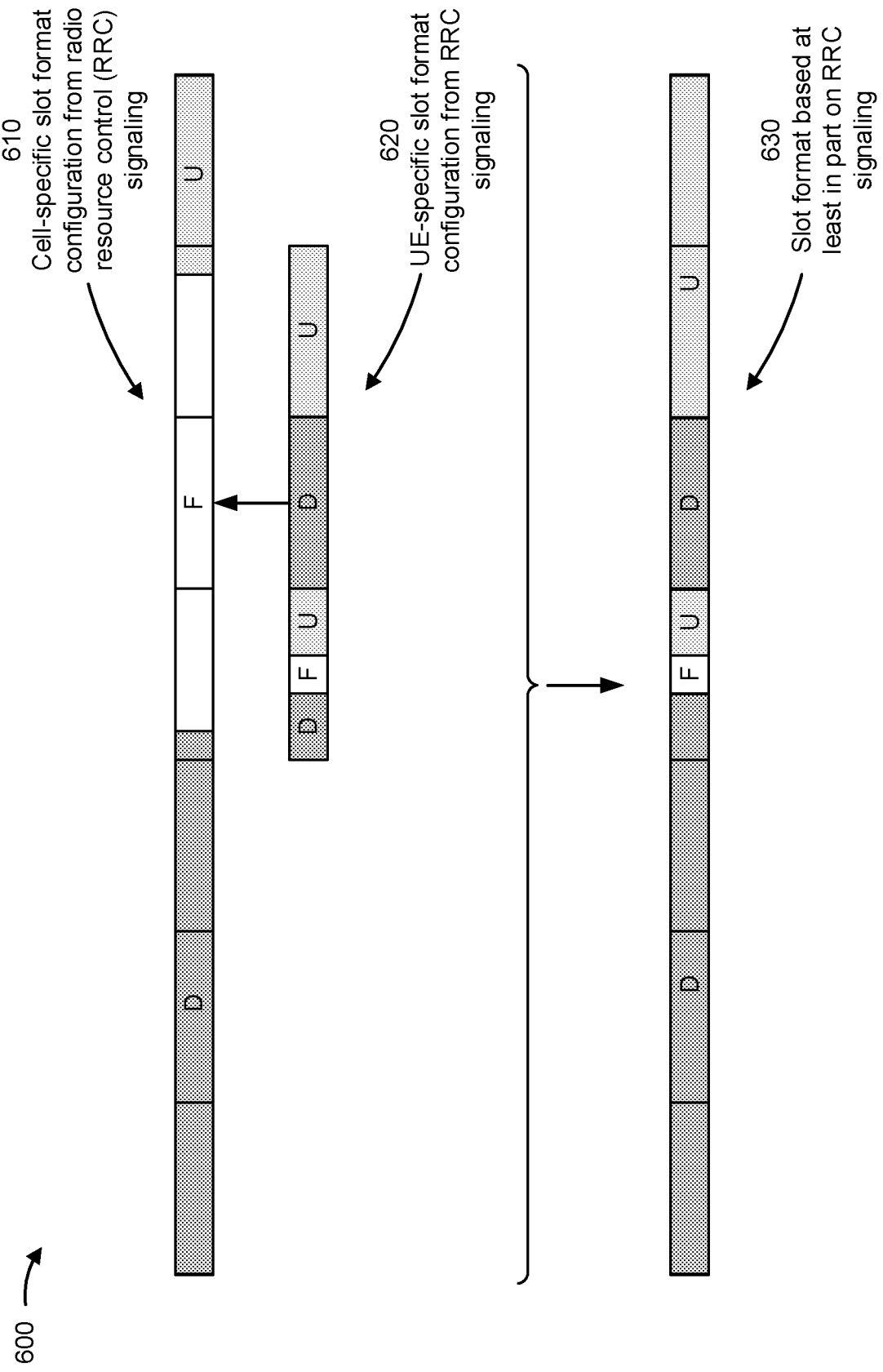
FIG. 6 is a block diagram conceptually illustrating an example of radio resource signaling for configuring a slot format, in accordance with various aspects of the present disclosure.

In some aspects, the RRC signaling may include a UE-specific slot format configuration (e.g., tdd-UL-DL-ConfigurationDedicated). The UE-specific slot format configuration may identify at least one of the one or more flexible symbols within the slot format (e.g., as identified in the cell-specific slot format configuration) for uplink or for downlink. In some aspects, the UE-specific slot format configuration may include a set of slot formats and associated slot indices to indicate one or more associated slots to apply to the slot formats of the set of slot formats. An example of determining a slot format from RRC signaling for slot format configuration is shown in FIG. 6 and described below.

As shown by reference number 550, the UE may receive one or more DCI communications for dynamic slot format determination. In some aspects, the UE may receive and/or apply any DCI communications for slot format determination the UE has determined to support. The UE may ignore and/or not receive any DCI communications that the UE has determined to not support.

As shown by reference number 560, the UE may determine a slot format based at least in part on the RRC signaling from the network (e.g., a cell-specific slot format configuration, a UE-specific slot format configuration, and/or the like). In some aspects, the UE may determine the slot format independently from any DCI communications for dynamic slot format determination that the UE has determined to not support. The UE may configure one or more components of the UE based at least in part on the slot format.

In some aspects, the RRC signaling may identify a set of symbols for downlink. The UE may determine the slot format independently from one or more DCI communications that indicate that one or more symbols of the set of symbols are to be configured for uplink. In other words, the UE may determine to not support one or more DCI communications that may indicate that the one or more symbols of the set of symbols are to be configured for uplink. For example, if the UE is configured by RRC signaling (e.g., a layer that is a higher layer than DCI) to receive a PDCCH communication, a PDSCH communication, a CSI-RS, and/or the like in a set of symbols of a slot, the UE may not support one or more DCI communications such as DCI format 0_0 communications, DCI format 0_1 communications, DCI format 1_0 communications, DCI format 1_1 communications, and/or DCI format 2_3 communication that may indicate to transmit a physical uplink shared channel (PUSCH) communication, a physical uplink control channel (PUCCH) communication, a physical random access channel (PRACH) communication, an SRS, and/or the like in a symbol of the set of symbols for DL. In other words, the UE may not support DCI communications that may indicate that the UE is to cancel identifications of symbols for DL, as identified in RRC signaling.

In some aspects, the RRC signaling identifies a set of symbols for uplink. The UE may determine the slot format independently from one or more DCI communications that indicate that one or more symbols of the set of symbols are to be configured for downlink. In other words, the UE may determine to not support one or more DCI communications that may indicate that the one or more symbols of the set of symbols are to be configured for downlink. For example, if the UE is configured by RRC signaling to transmit an SRS, a PUCCH communication, a PUSCH communication, a PRACH communication, and/or the like in a set of symbols of a slot, the UE may not support one or more DCI communications such as DCI format 1_0 communications, DCI format 1_1 communications, DCI format 0_1 communications, and/or the like that may indicate to receive a CSI-RS, a PDSCH communication, and/or the like in a symbol of the set of symbols for UL. In other words, the UE may not support DCI communications that may indicate that the UE is to cancel identifications of symbols for UL, as identified in RRC signaling.

In some aspects, the UE may determine the slot format independently from one or more DCI communications for dynamic slot format determination based at least in part on receiving an indication to perform a radio resource management (RRM) measurement during a set of symbols associated with the slot format and the one or more DCI communications indicating that one or more symbols of the set of symbols are to be configured for uplink (e.g., a DCI format 0_0 communication, a DCI format 0_1 communication, a DCI format 1_0 communication, a DCI format 1_1 communication, a DCI format 2_3 communication, and/or the like). In other words, the UE may not support DCI communications that may indicate that the UE is to cancel identifications of symbols for preforming RRM measurement (e.g., for receiving a signal for measurement). In some aspects, the UE may receive the indication to perform an RRM measurement via a synchronization signal/physical broadcast channel (SS/PBCH) block. In some aspects, the UE may receive the indication to perform an RRM measurement via a CSI-RS. In some aspects, the RRM may be associated with channel state information (CSI), a CQI, an RSRP, an RSRQ, a carrier RSSI, and/or the like.

By determining to not support one or more DCI communications for dynamic slot format determination, the UE may conserve computing resources that may otherwise be consumed by attempting to dynamically determine the slot format. Additionally, the UE may conserve computing, communication, and/or network resources that may otherwise be consumed by recovering from a communication error caused by the UE having insufficient computing resources to perform a dynamic determination of the slot format.

As indicated above, FIGS. 5A and 5B are provided as one or more examples. Other examples may differ from what is described with respect to FIGS. 5A and 5B.

FIG. 6 is a block diagram conceptually illustrating an example 600 of radio resource signaling for configuring a slot format in accordance with various aspects of the present disclosure.

As shown by reference number 610, a cell-specific slot format configuration from RRC signaling may identify portions (e.g., symbols) of a set of slots as UL, DL, or flexible. In some aspects, the network may transmit the cell-specific slot format configuration to a plurality of cells, with the flexible portions able to be identified for UL or DL by another configuration communication (e.g., a UE-specific slot format configuration from RRC signaling, a DCI communication, and/or the like).

As shown by reference number 620, a UE-specific slot format configuration from RRC signaling may identify portions (e.g., symbols) of the set of slots as UL, DL or flexible. In some aspects, the UE-specific slot format configuration may be configured to override identification of flexible symbols within the set of slots associated with the cell-specific slot format configuration. In other words, the UE-specific slot format configuration may be restricted from overriding portions of the cell-specific slot format configuration that identify the portions as UL or DL. In some aspects, the UE-specific slot format configuration may include a set of slot formats and one or more indices that indicate to which slots of the cell-specific slot format configuration the set of slot formats are to be applied. For example, the UE-specific slot format configuration may include the set of 3 slots, as shown, and an index of 3 that indicates that the set of 3 slots are to be applied to slots 3, 4, and 5 of the cell-specific slot format configuration.

As shown by reference number 630, the UE may determine a slot format based at least in part on the RRC signaling (e.g., include the cell-specific slot format configuration and the UE-specific slot format configuration). As shown, the slot format may include one or more portions identified as flexible. In some aspects, the one or more portions identified as flexible may be identified for UL or DL based at least in part on a supported DCI communication.

In some aspects, the one or more portions (e.g., symbols) identified as flexible may be used as time domain guard symbols for DL to UL or UL to DL switching. In some aspects, the UE may receive an SS/PBCH block, transmit a PRACH preamble, receive a PDCCH communication in Type0-PDCCH search space set for SIB (e.g., SIB1) reception, receive a PDCCH communication in a CORESET, and/or the like in the symbols identified as flexible. In some aspects, the UE may transmit a PDSCH communication based at least in part on DL semi-persistent scheduling (SPS), a PUSCH communication based at least in part on a Type 1 UL configured grant, a PUSCH communication based at least in part on a Type 2 UL configured grant, and/or the like in the symbols identified as flexible.

As indicated above, FIG. 6 is provided as an example. Other examples may differ from what is described with respect to FIG. 6.

Figure 7:
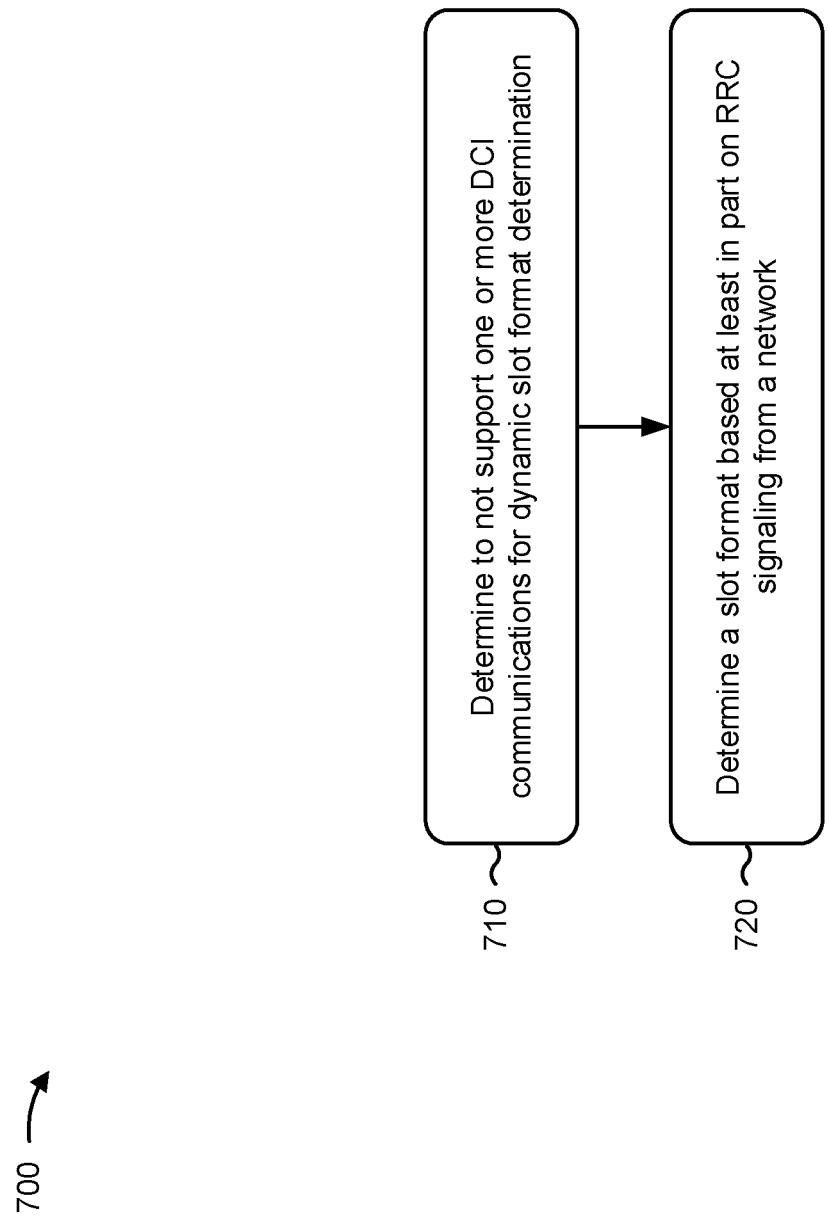
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 and/or the like) performs operations associated with complexity reduction for slot format determination.

As shown in FIG. 7, in some aspects, process 700 may include determining to not support one or more DCI communications for dynamic slot format determination (block 710). For example, the UE (e.g., using controller/processor 280 and/or the like) may determine to not support one or more DCI communications for dynamic slot format determination, as described above.

As further shown in FIG. 7, in some aspects, process 700 may include determining a slot format based at least in part on RRC signaling from a network and independently from the one or more DCI communications for dynamic slot format determination (block 720). For example, the UE (e.g., using controller/processor 280 and/or the like) may determine a slot format based at least in part on RRC signaling from a network and independently from the one or more DCI communications for dynamic slot format determination, as described above.

Process 700 may include additional aspects, such as any single aspect or any combination of aspects described below and/or in connection with one or more other processes described elsewhere herein.

In a first aspect, the one or more DCI communications comprise a slot format indication DCI.

In a second aspect, alone or in combination with the first aspect, the one or more DCI communications comprise one or more of: a DCI format 2_0 communication; a DCI format 1_0 communication; a DCI format 1_1 communication; a DCI format 0_0 communication; a DCI format 0_1 communication; or a DCI format 2_3 communication.

In a third aspect, alone or in combination with one or more of the first and second aspects, the slot format is for a carrier in an unpaired spectrum.

In a fourth aspect, alone or in combination with one or more of the first through third aspects, the determination to not support the one or more DCI communications for dynamic slot format determination is based at least in part on a configuration of the UE.

In a fifth aspect, alone or in combination with one or more of the first through fourth aspects, the configuration of the UE is based at least in part on one or more of: capabilities of the UE; or an operation mode of the UE.

In a sixth aspect, alone or in combination with one or more of the first through fifth aspects, the configuration of the UE is reconfigurable to support the one or more DCI communications for dynamic slot format determination.

In a seventh aspect, alone or in combination with one or more of the first through sixth aspects, the RRC signaling comprises one or more indications of one or more of: a cell-specific slot format configuration; or a UE-specific slot format configuration.

In an eighth aspect, alone or in combination with one or more of the first through seventh aspects, the RRC signaling comprises one or more indications of one or more of: a cell-specific slot format configuration that identifies one or more flexible symbols within the slot format; and a UE-specific slot format configuration that identifies at least one of the one or more flexible symbols within the slot format for uplink or for downlink.

In a ninth aspect, alone or in combination with one or more of the first through eighth aspects, the UE-specific slot format configuration identifies at least one of the one or more flexible symbols within the slot format for downlink to receive one or more transmissions of: a physical downlink control channel, a physical downlink shared channel, or a channel state indicator reference signal.

In a tenth aspect, alone or in combination with one or more of the first through ninth aspects, the UE-specific slot format configuration identifies at least one of the one or more flexible symbols within the slot format for uplink to transmit one or more transmissions of: a physical uplink control channel, a physical uplink shared channel, a sounding reference signal, or a physical random access channel.

In an eleventh aspect, alone or in combination with one or more of the first through tenth aspects, the determination to not support the one or more DCI communications for dynamic slot format determination is based at least in part on: the determination of the slot format based at least in part on the RRC signaling, wherein the RRC signaling identifies a set of symbols for downlink, and the one or more DCI communications indicating that one or more symbols of the set of symbols are to be configured for uplink.

In a twelfth aspect, alone or in combination with one or more of the first through eleventh aspects, the determination to not support the one or more DCI communications for dynamic slot format determination is based at least in part on: the determination of the slot format based at least in part on the RRC signaling, wherein the RRC signaling identifies a set of symbols for uplink, and the one or more DCI communications indicating that one or more symbols of the set of symbols are to be configured for downlink.

In a thirteenth aspect, alone or in combination with one or more of the first through twelfth aspects, process 700 includes receiving an indication to perform an RRM measurement during a set of symbols associated with the slot format, wherein the determination to not support the one or more DCI communications for dynamic slot format determination is based at least in part on the one or more DCI communications indicating that one or more symbols of the set of symbols are to be configured for uplink.

In a fourteenth aspect, alone or in combination with one or more of the first through thirteenth aspects, receiving the indication to perform an RRM measurement during a set of symbols comprises: receiving the indication via a synchronization signal/physical broadcast channel block; or receiving the indication via a channel state information reference signal.

In a fifteenth aspect, alone or in combination with one or more of the first through fourteenth aspects, the RRM is associated with one or more of channel state information, a channel quality indicator, a reference signal received power, reference signal received quality, or a carrier received signal strength indicator.

In a sixteenth aspect, alone or in combination with one or more of the first through fifteenth aspects, process 700 includes providing, to the network, an indication that the UE does not support the one or more DCI communications for dynamic slot format determination.

In a seventeenth aspect, alone or in combination with one or more of the first through sixteenth aspects, providing the indication comprises one or more of: providing an explicit indication that the UE does not support the one or more DCI communications for dynamic slot format determination; providing an indication of capabilities of the UE; or providing an indication of an operation mode of the UE.

In an eighteenth aspect, alone or in combination with one or more of the first through seventeenth aspects, process 700 includes configuring one or more components of the UE based at least in part on the slot format.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining to not support one or more downlink control information (DCI) communications that indicate the UE is to cancel identifications of symbols for downlink identified in radio resource control (RRC) signaling; and
   determining a slot format based at least in part on the RRC signaling and independently from the one or more DCI communications.

2. The method of claim 1, wherein the one or more DCI communications comprise a slot format indication DCI.

3. The method of claim 1, wherein the one or more DCI communications comprise one or more of:
   a DCI format 2_0 communication;
   a DCI format 1_0 communication;
   a DCI format 1_1 communication;
   a DCI format 0_0 communication;
   a DCI format 0_1 communication; or
   a DCI format 2_3 communication.

4. The method of claim 3, wherein the slot format is for a carrier in an unpaired spectrum.

5. The method of claim 1, wherein the determination to not support the one or more DCI communications is based at least in part on a configuration of the UE.

6. The method of claim 5, wherein the configuration of the UE is based at least in part on one or more of:
   capabilities of the UE; or
   an operation mode of the UE.

7. The method of claim 5, wherein the configuration of the UE is reconfigurable to support the one or more DCI communications.

8. The method of claim 1, wherein the RRC signaling comprises one or more indications of one or more of:
   a cell-specific slot format configuration; or
   a UE-specific slot format configuration.

9. The method of claim 1, wherein the RRC signaling comprises one or more indications of one or more of:
   a cell-specific slot format configuration that identifies one or more flexible symbols within the slot format; and
   a UE-specific slot format configuration that identifies at least one of the one or more flexible symbols within the slot format for uplink or for downlink.

10. The method of claim 9, wherein the UE-specific slot format configuration identifies at least one of the one or more flexible symbols within the slot format for downlink to receive one or more transmissions of:
    a physical downlink control channel,
    a physical downlink shared channel, or
    a channel state indicator reference signal.

11. The method of claim 9, wherein the UE-specific slot format configuration identifies at least one of the one or more flexible symbols within the slot format for uplink to transmit one or more transmissions of:
    a physical uplink control channel,
    a physical uplink shared channel,
    a sounding reference signal, or
    a physical random access channel.

12. The method of claim 1, wherein the determination to not support the one or more DCI communications is based at least in part on:
    the determination of the slot format based at least in part on the RRC signaling, wherein the RRC signaling identifies a set of symbols for downlink, and
    the one or more DCI communications indicating that one or more symbols of the set of symbols are to be configured for uplink.

13. The method of claim 1, wherein the determination to not support the one or more DCI communications is based at least in part on:
    the determination of the slot format based at least in part on the RRC signaling, wherein the RRC signaling identifies a set of symbols for uplink, and
    the one or more DCI communications indicating that one or more symbols of the set of symbols are to be configured for downlink.

14. The method of claim 1, further comprising:
    receiving an indication to perform a radio resource management (RRM) measurement during a set of symbols associated with the slot format,
    wherein the determination to not support the one or more DCI communications is based at least in part on the one or more DCI communications indicating that one or more symbols of the set of symbols are to be configured for uplink.

15. The method of claim 14, wherein receiving the indication to perform the RRM measurement during the set of symbols comprises:

receiving the indication via a synchronization signal/physical broadcast channel block; or receiving the indication via a channel state information reference signal.

16. The method of claim 14, wherein the RRM is associated with one or more of channel state information, a channel quality indicator, a reference signal received power, reference signal received quality, or a carrier received signal strength indicator.

17. The method of claim 1, further comprising:
providing, to a network, an indication that the UE does not support the one or more DCI communications.

18. The method of claim 17, wherein providing the indication comprises one or more of:
providing an explicit indication that the UE does not support the one or more DCI communications;
providing an indication of capabilities of the UE; or
providing an indication of an operation mode of the UE.

19. The method of claim 1, further comprising:
configuring one or more components of the UE based at least in part on the slot format.

20. A user equipment (UE) for wireless communication, comprising:
one or more memories; and
one or more processors operatively coupled to the one or more memories, the one or more memories and the one or more processors, individually or collectively configured to:
determine to not support one or more downlink control information (DCI) communications that indicate the UE is to cancel identifications of symbols for downlink identified in radio resource control (RRC) signaling; and
determine a slot format based at least in part on the RRC signaling and independently from the one or more DCI communications.

21. A non-transitory computer-readable medium storing one or more instructions for wireless communication, the one or more instructions comprising:
one or more instructions that, when executed by one or more processors of a user equipment (UE), cause the one or more processors to:
determine to not support one or more downlink control information (DCI) communications that indicate the UE is to cancel identifications of symbols for downlink identified in radio resource control (RRC) signaling; and
determine a slot format based at least in part on the RRC signaling and independently from the one or more DCI communications.

22. An apparatus for wireless communication, comprising:
means for determining to not support one or more downlink control information (DCI) communications that indicate a UE is to cancel identifications of symbols for downlink identified in radio resource control (RRC) signaling; and
means for determining a slot format based at least in part on the RRC signaling and independently from the one or more DCI communications.

* * * * *